United States Patent [19]
Batt

[11] 3,955,862
[45] May 11, 1976

[54] THRUST BEARINGS

[75] Inventor: Robert Stanley Batt, Barby, near Rugby, England

[73] Assignee: The Torrington Co., Ltd., Coventry, England

[22] Filed: Mar. 4, 1975

[21] Appl. No.: 555,124

[30] Foreign Application Priority Data

Mar. 5, 1974 United Kingdom.................. 9745/74

[52] U.S. Cl............................ 308/235; 29/148.4 C
[51] Int. Cl.² ........................................ F16C 33/38
[58] Field of Search ........... 308/217, 235, 219, 201, 308/3 R; 29/148.4

[56] References Cited
FOREIGN PATENTS OR APPLICATIONS

| | | |
|---|---|---|
| 1,296,976 | 11/1972 | United Kingdom.................. 308/235 |
| 707,198 | 4/1954 | United Kingdom.................. 308/235 |
| 697,153 | 9/1953 | United Kingdom.................. 308/235 |

Primary Examiner—Robert R. Song
Assistant Examiner—Richard A. Bertsch
Attorney, Agent, or Firm—Frank S. Troidl

[57] ABSTRACT

This invention is a new thrust bearing cage and a new method for assembling a thrust bearing cage on an annular thrust race.

The thrust bearing cage includes a plurality of adjacent carriers each having a tab extending from one side and a circumferentially opposed recess. The carriers are permanently connected together by suitable means such as by welding the tab in the recess of an adjacent carrier.

The new cage can be assembled within a thrust race by arranging the carriers in side-by-side relationship, radially adjusting each carrier to compensate for differences in tolerances between the carriers and then permanently welding the carriers together.

5 Claims, 4 Drawing Figures

THRUST BEARINGS

This invention concerns thrust bearings.

The manufacture of large bearings is always expensive, partly because large machines are required with which to make them and additionally due to the fact that machinery size limitations impose manufacturing restrictions on the bearing maker.

For example, where it is required to make an annular thrust bearing of, say 1200 mm. diameter which has a relatively small cross section of about 25 mm. between its internal and external peripheries and uses a roller of some 8 mm. diameter it can be seen that, for the manufacture of a metal cage a large turning machine is necessary both for providing the cage blank and also for creating roller retaining pockets; and for the alternative manufacture of a plastic or a sintered cage a machine with a large shot capacity and a large platten size is required.

It has already been proposed to meet this problem by making the cage from a number of segments each receiving and/or retaining several of the thrust bearing rollers, and fixing the segments to each other to create a complete assembly, the fixing being by various means such as 'dovetailing' and/or glueing or welding. This method has proven successful but also has its limitations, one of which is the accommodation of the length tolerance necessary for each segment, which, of course, poses a bigger problem for larger bearings. The greater the number of segments used, the greater the total resulting build-up of circumferential tolerance.

According to one feature of the present invention, a roller bearing cage comprises a plurality of individual roller carriers arranged in circular side-by-side relationship and each having at least circumferentially opposed side regions of convexly curved shape, a single roller receiving pocket in each roller carrier and complementarily engageable means located respectively at said opposed side regions of each carrier for enabling said carrier to be secured to the carriers immediately on each side of it.

By virtue of the construction proposed by the invention, it is possible to assemble a thrust bearing cage by positioning the requisite number of roller carriers along a circular path and thereafter securing the interengaged carriers together.

According to another feature of the invention, therefore, a method of assembling a roller thrust bearing cage includes the steps of arranging in juxtaposed relationship a plurality of individual roller carriers each having convexly curved circumferential side regions and a single roller receiving pocket, registering complementarily engageable means of adjoining carriers with one another, adjusting said carriers into their final positions in the cage assembly by means of a jig having locating means engageable in the roller pockets and thereafter fixedly securing together the complementarily engaged means of said carriers.

The securing of the carriers together may be effected by using an adhesive but preferably the carriers are welded together, sonic welding being preferred in the case of moulded plastic carriers.

The roller carriers are conveniently of generally flat, plate-like configuration and may take the shape essentially of part segments of circles or of rectangles having convexly curved circumferential sides. Preferably, however, the carriers are flat, circular discs of which the complementarily engageable means comprise a tab projecting from one circumferential side region of the disc and a corresponding, tab-receiving recess formed in the opposed circumferential side region thereof.

The invention will be described further, by way of example, with reference to the accompanying drawings, in which.

Figure 1:
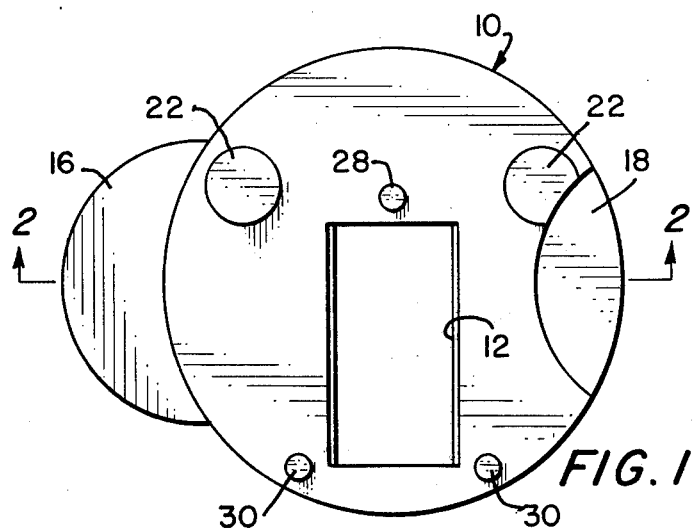
FIG. 1 is a plan view of a roller carrier embodying the invention.
Figure 3:
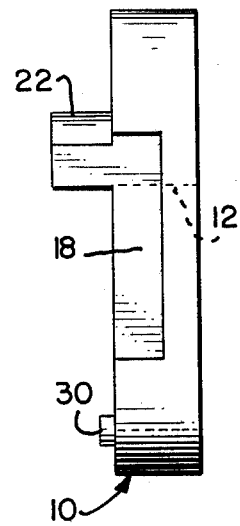
FIG. 3 is a side elevation taken at right angles to the section of FIG. 2.

In the drawings, a roller carrier generally designated 10 is shown in FIG. 1 as being of circular shape and provided with a radially directed roller pocket 12 which is shaped to receive and retain a bearing roller 14. The carrier 10 may be made for example of mild steel or it may be sintered from metal powder or it may be formed of a plastics material such as glass or carbon fibre reinforced nylon.

The roller receiving pocket 12 lies intermediate opposed circumferential side regions of the carrier 10 which are respectively formed with a part-circular projecting tab 16 and a complementary part-circular recess 18.

Figure 4:
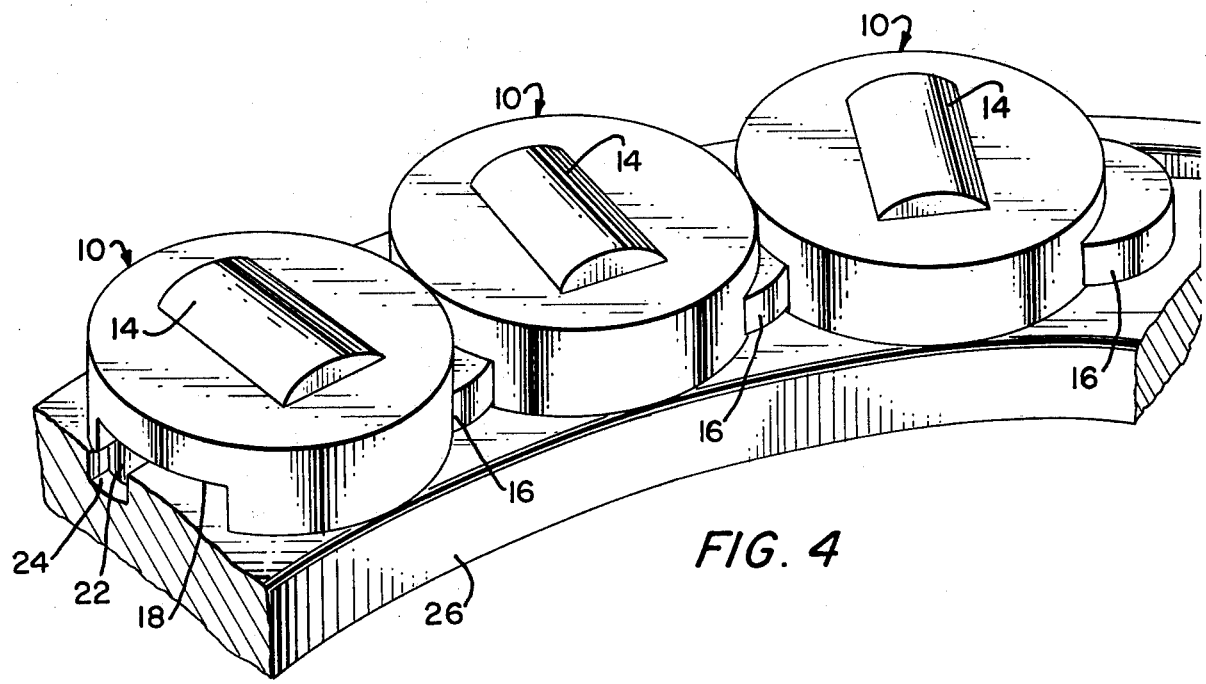
FIG. 4 is a perspective view of a part of a roller thrust race bearing.

In a roller thrust bearing cage assembled using the carriers proposed by the invention, a plurality of carriers 10 are arranged in side-by-side relationship as generally shown in FIG. 4, with the tab 16 of each carrier seated within the recess 18 of the adjacent carrier. During the assembly, as many carriers 10 as are required to make up a cage of a required diameter are assembled in circular juxtaposed relationship before the rollers 14 are engaged in the pockets 12 and the carrier tabs 16 are each registered within a cooperating recess 18 of the next adjoining carrier. This operation is carried out in a jig (not shown) having a head capable of being indexed around the circular path along which the carriers are distributed, and the head is provided with a projecting wedge member adapted to engage temporarily within a roller receiving pocket 12. Engagement of the wedge member within the pocket 12 is effected at each position into which the jig head is indexed so that after the head has completed one complete revolution around the circular path, each carrier is positioned at a predetermined location within that path and any manufacturing tolerances as between one carrier and its neighbor are taken up by relative positioning between the respective tabs 16 and recesses 18. The only essential manufacturing prerequisite is that all the tolerances shall be negative that is to say that most particularly the diameter of the carriers 10 shall not exceed a prescribed maximum. Apart from this, all other assembly tolerances are eliminated by the invention.

Figure 2:
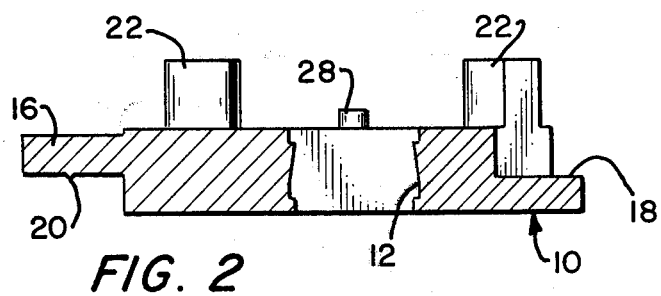
FIG. 2 is a section taken on line II—II of FIG. 1.

After the carriers have been arranged and accurately located as described, the tabs 16 are each welded into the recessed portion of the next adjoining carrier and for this purpose it will be noted more especially from FIG. 2 that each tab is formed with a small part-circular rib 20 to facilitate initiation of the welding action.

The race described above will be seen to be very readily produced and assembled from simple components, each size of which moreover is capable of being used in the assembly of a number of different sizes of bearing race. Moreover, once the individual roller carriers 10 have been fixedly secured together during the final step of the assembly procedure, the cage is ready for use and is capable of reliable service as it stands. However, for example, when the thrust bearing is intended for use in particularly heavily loaded conditions, it is possible to provide each carrier with a pair of circumferentially spaced pegs or other guides 22 which are engageable in a groove 24 of one of the bearing races 26. In acting to guide the carriers 10 around the circular path described by the rollers 14, the pegs 22 serve to prevent any tendency which the individual carriers might have to rotate about their own centres consequent upon the roller movement and thus they relieve the load imposed upon the welded tabs 16 and recessed portions 18.

Since in many instances it is preferred that the bearing cage shall be race riding rather than carried by the rollers 14 themselves, the invention further provides on each carrier 10 an upstanding spacer 28 lying intermediate the pegs 22 and adjacent one end of the roller receiving pocket 12 together with a further pair of upstanding spacers 30 situated one each side of the other end of the roller receiving pocket 12.

I claim:

1. A thrust bearing cage comprising: a plurality of rolling member carriers arranged in circular side-by-side relationship, each carrier having an enclosed rolling member pocket; said carrier also having a single tab extending from one side and a circumferentially opposed recess; the tabs of each carrier extending into the recess of an adjacent carrier and fixedly connected to said adjacent carrier in a manner to prevent relative or pivotal movement of the carriers.

2. A thrust bearing cage in accordance with claim 1 wherein: the carriers are flat carriers, the rolling member pocket is a roller pocket, the tabs are in the shape of a part circle and the recesses are also in the shape of a part circle.

3. A thrust bearing cage in accordance with claim 2 wherein the carrier is in the shape of a flat disc.

4. A method of assembling on an annular thrust race a plurality of carriers each having a roller pocket, a part circular tab, and a circumferentially opposed part circular recess comprising the steps of: arranging the carriers in side-by-side relationship on the annular race with the tab of each carrier seated with the recess of an adjacent carrier; and positioning each carrier in a predetermined location on the annular race to adjust for any manufacturing tolerances as between one carrier and its neighbor; and permanently affixing each tab into the recess portion of the next adjoining carrier in a manner to prevent relative or pivotal movement of the carriers.

5. A method of assembling a roller thrust bearing cage, including the steps of arranging in juxtaposed relationship, a plurality of individual roller carriers, each having convexly curved circumferential side regions and a single roller receiving pocket, registering complemental engagable means of adjoining carriers with one another, adjusting said carriers into their final positions in the cage assembly by means of a jig having locating means engagable in the roller pockets and thereafter, fixedly securing together the complemental engaged means of said carriers in a manner to prevent relative or pivotal movement of the carriers.

* * * * *